United States Patent
Qin et al.

(10) Patent No.: US 12,194,978 B2
(45) Date of Patent: Jan. 14, 2025

(54) TORQUE COMPENSATION METHOD AND APPARATUS OF VEHICLE, AND COMPUTER-READABLE STORAGE MEDIUM

(71) Applicant: CONTEMPORARY AMPEREX TECHNOLOGY (HONG KONG) LIMITED, Hong Kong (CN)

(72) Inventors: Haiming Qin, Ningde (CN); Bao Li, Ningde (CN); Kai Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 280 days.

(21) Appl. No.: 17/875,439

(22) Filed: Jul. 28, 2022

(65) Prior Publication Data

US 2023/0219543 A1 Jul. 13, 2023

Related U.S. Application Data

(63) Continuation of application No. PCT/CN2022/071057, filed on Jan. 10, 2022.

(51) Int. Cl.
  *B60T 8/176* (2006.01)
  *B60T 8/171* (2006.01)
  (Continued)

(52) U.S. Cl.
  CPC ............ *B60T 8/1761* (2013.01); *B60T 8/171* (2013.01); *B60T 13/745* (2013.01);
  (Continued)

(58) Field of Classification Search
  CPC ...... B60T 8/1761; B60T 8/171; B60T 13/745; B60T 2220/04; B60T 2250/04;
  (Continued)

(56) References Cited

U.S. PATENT DOCUMENTS

| 2007/0199745 A1 | 8/2007 | Hayashi |
| 2013/0054062 A1 | 2/2013 | Matsushita |

(Continued)

FOREIGN PATENT DOCUMENTS

| CN | 109080499 A | 12/2018 |
| CN | 110461665 A | 11/2019 |

(Continued)

OTHER PUBLICATIONS

Extended European Search Report issued Jun. 15, 2023, in European Application No. 22734083.3, citing above-listed references, 9 pages.

(Continued)

*Primary Examiner* — Jacob M Amick
(74) *Attorney, Agent, or Firm* — XSENSUS LLP

(57) ABSTRACT

This application provides a torque compensation method for a vehicle, a torque compensation apparatus of a vehicle, and an associated computer-readable storage medium. The torque compensation method includes: when a vehicle control module determines that the vehicle is in a sliding state during a brake idle stroke, obtaining, by the vehicle control module, a pressure of a brake master cylinder of the vehicle, and controlling a motor of the vehicle based on the pressure of the brake master cylinder to output a compensation torque. In this application, a range of the brake idle stroke of the vehicle can be precisely determined, so as to control the motor of the vehicle to output the compensation torque in a timely manner, thereby effectively suppressing sliding during the brake idle stroke of the vehicle and ensuring safe driving.

18 Claims, 2 Drawing Sheets

(51) Int. Cl.
　　*B60T 8/1761* (2006.01)
　　*B60T 13/74* (2006.01)
(52) U.S. Cl.
　　CPC ....... *B60T 2220/04* (2013.01); *B60T 2250/04* (2013.01); *B60T 2270/88* (2013.01)
(58) Field of Classification Search
　　CPC ...... B60T 2270/88; B60T 10/00; B60T 10/02; B60T 10/04; B60T 2201/04; B60T 2201/06
　　See application file for complete search history.

(56) References Cited

U.S. PATENT DOCUMENTS

2020/0156603 A1　　5/2020　Busse et al.
2020/0398843 A1*　12/2020　Sabbatini ................ B60T 7/122

FOREIGN PATENT DOCUMENTS

| CN | 110605971 A | 12/2019 |
| CN | 112078556 A | 12/2020 |
| CN | 112440758 A | 3/2021 |
| CN | 113581152 A | 11/2021 |
| EP | 2743151 A1 | 6/2014 |
| JP | 2007-230288 A | 9/2007 |
| JP | 2009-274684 A | 11/2009 |
| WO | 2021/029330 A1 | 2/2021 |

OTHER PUBLICATIONS

International Search Report and Written Opinion mailed on Sep. 20, 2022, in corresponding PCT Application No. PCT/CN2022/071057, 16 pages.

Office Action issued Feb. 13, 2024 in Japanese Patent Application No. 2022-535899 with English translation thereof.

* cited by examiner

TORQUE COMPENSATION METHOD AND APPARATUS OF VEHICLE, AND COMPUTER-READABLE STORAGE MEDIUM

CROSS-REFERENCE TO RELATED APPLICATION

The present application is a continuation of International Application No. PCT/CN2022/071057, filed Jan. 10, 2022, the entire contents of which is incorporated herein by reference in its entirety.

TECHNICAL FIELD

This application relates to the vehicle field, and specifically to a torque compensation method for a vehicle, a torque compensation apparatus of a vehicle, and an associated computer-readable storage medium.

BACKGROUND

Energy conservation and emission reduction is the key to sustainable development of the automobile industry. Due to advantages of energy conservation and environmental friendliness, electric vehicles have become an important part of sustainable development in the automobile industry. For the electric vehicles, control technology is an important factor related to their development.

During driving, an electric vehicle may slide during a brake idle stroke, which may cause a traffic accident such as collision, and even endanger people's life, thereby posing significant safety hazards.

SUMMARY

In view of this, this application provides a torque compensation method for a vehicle, a torque compensation apparatus of a vehicle, and an associated computer-readable storage medium, so as to precisely determine a range of a brake idle stroke of a vehicle and control a motor of a vehicle to output a compensation torque in a timely manner, thereby effectively suppressing sliding during the brake idle stroke of the vehicle and ensuring safe driving.

According to a first aspect, this application provides a torque compensation method for a vehicle, where the vehicle includes a vehicle control module, and the torque compensation method includes: when the vehicle control module determines that the vehicle is in a sliding state during a brake idle stroke, obtaining, by the vehicle control module, a pressure of a brake master cylinder of the vehicle, and controlling a motor of the vehicle based on the pressure of the brake master cylinder to output a compensation torque.

In the technical solution of this embodiment of this application, the applicants have found through researches that, when a vehicle slides during a brake idle stroke, a braking force applied by the brake master cylinder on wheels of the vehicle is not large enough to brake the wheels of the vehicle. In this case, the pressure of the brake master cylinder can reflect a range of the brake idle stroke more precisely. Controlling the motor of the vehicle based on the pressure of the brake master cylinder to output the compensation torque in a timely manner can effectively suppress sliding during the brake idle stroke of the vehicle, and ensure safe driving.

In some embodiments, the obtaining, by the vehicle control module, a pressure of a brake master cylinder of the vehicle, and controlling a motor of the vehicle based on the pressure of the brake master cylinder to output a compensation torque includes: in a case that the pressure of the brake master cylinder obtained by the vehicle control module includes a first pressure, controlling, by the vehicle control module, the motor of the vehicle to output a compensation torque including a first compensation torque; and in a case that the pressure of the brake master cylinder obtained by the vehicle control module includes a second pressure, controlling, by the vehicle control module, the motor of the vehicle to output a compensation torque including a second compensation torque; where the first pressure is less than the second pressure, and the first compensation torque is greater than the second compensation torque. In the torque compensation method of this embodiment of this application, a smaller pressure of the brake master cylinder indicates a larger compensation torque that the motor of the vehicle needs to output; and a larger pressure of the brake master cylinder indicates a smaller compensation torque that the motor of the vehicle needs to output. The motor of the vehicle is precisely controlled based on the pressure of the brake master cylinder to output an appropriate compensation torque in a timely manner, thereby effectively suppressing sliding during the brake idle stroke of the vehicle.

In some embodiments, the obtaining, by the vehicle control module, a pressure of a brake master cylinder of the vehicle includes: obtaining, by the vehicle control module, the pressure of the brake master cylinder of the vehicle in real time. In the torque compensation method of this embodiment of this application, because a real-time pressure of the brake master cylinder reflects a real-time braking force applied on the wheels, the range of the brake idle stroke can be reflected more precisely, and the motor of the vehicle is controlled to output the compensation torque in a timely manner. In this way, the torque compensation method for the vehicle is further detailed.

In some embodiments, the obtaining, by the vehicle control module, a pressure of a brake master cylinder of the vehicle, and controlling a motor of the vehicle based on the pressure of the brake master cylinder to output a compensation torque further includes: obtaining, by the vehicle control module, the pressure of the brake master cylinder of the vehicle and a rotation speed of the motor of the vehicle in real time, and controlling, based on the pressure of the brake master cylinder and the rotation speed of the motor of the vehicle, to output the compensation torque.

In some embodiments, the obtaining, by the vehicle control module, the pressure of the brake master cylinder of the vehicle and a rotation speed of the motor of the vehicle in real time, and controlling, based on the pressure of the brake master cylinder and the rotation speed of the motor of the vehicle, the motor of the vehicle to output the compensation torque further includes: in a case that the pressure of the brake master cylinder obtained by the vehicle control module includes a third pressure, and the rotation speed of the motor of the vehicle includes a first rotation speed, controlling, by the vehicle control module, the motor of the vehicle to output a compensation torque including a third compensation torque; and in a case that the pressure of the brake master cylinder obtained by the vehicle control module includes the third pressure, and the rotation speed of the motor of the vehicle includes a second rotation speed, controlling, by the vehicle control module, the motor of the vehicle to output a compensation torque including a fourth compensation torque; where the first rotation speed is less than the second rotation speed, and the third compensation torque is less than the fourth compensation torque.

In the torque compensation method of this embodiment of this application, for controlling the motor of the vehicle based on both the pressure of the brake master cylinder of the vehicle and the rotation speed of the motor obtained in real time to output the compensation torque in a timely manner, some factors such as inertia of the vehicle are considered, and this more effectively suppresses sliding during the brake idle stroke of the vehicle.

In some embodiments, that the vehicle control module determines that the vehicle is in the sliding state during the brake idle stroke includes: when the vehicle control module determines that a driving speed of the vehicle is within a first speed range corresponding to a low-speed driving mode, and a decrease in a brake pedal opening degree of the vehicle is greater than a first opening degree value, further determining, by the vehicle control module, whether a rotation speed of the motor of the vehicle is increased; and when the vehicle control module determines that the rotation speed of the motor of the vehicle is increased, determining, by the vehicle control module based on a gear of the vehicle and a rotation direction of the motor of the vehicle, whether the vehicle is in the sliding state during the brake idle stroke.

According to a second aspect, a computer-readable storage medium is provided, where the computer-readable storage medium stores a computer instruction, and when the computer instruction is executed by a computing device, the computing device is enabled to implement the torque compensation method according to the foregoing embodiments.

According to a third aspect, a torque compensation apparatus of a vehicle is provided, including a vehicle control module, where the vehicle control module is configured to: when it is determined that the vehicle is in a sliding state during a brake idle stroke, obtain a pressure of a brake master cylinder of the vehicle, and control, based on the pressure of the brake master cylinder, a motor of the vehicle to output a compensation torque of the vehicle.

In some embodiments, the vehicle control module is configured to: in a case that the pressure of the brake master cylinder obtained by the vehicle control module includes a first pressure, control the motor of the vehicle to output a compensation torque including a first compensation torque; and the vehicle control module is configured to: in a case that the pressure of the brake master cylinder obtained by the vehicle control module includes a second pressure, control the motor of the vehicle to output a compensation torque including a second compensation torque, where the first pressure is less than the second pressure, and the first compensation torque is greater than the second compensation torque.

In some embodiments, the vehicle control module is configured to obtain the pressure of the brake master cylinder of the vehicle in real time.

In some embodiments, the vehicle control module is configured to obtain the pressure of the brake master cylinder of the vehicle and a rotation speed of the motor of the vehicle in real time, and control, based on the pressure of the brake master cylinder and the rotation speed of the motor of the vehicle, the motor of the vehicle to output the compensation torque.

In some embodiments, the vehicle control module is configured to: in a case that the pressure of the brake master cylinder obtained by the vehicle control module includes a third pressure, and the rotation speed of the motor of the vehicle includes a first rotation speed, control the motor of the vehicle to output a compensation torque including a third compensation torque; and the vehicle control module is configured to: in a case that the pressure of the brake master cylinder obtained by the vehicle control module includes the third pressure, and the rotation speed of the motor of the vehicle includes a second rotation speed, control the motor of the vehicle to output a compensation torque including a fourth compensation torque, where the first rotation speed is less than the second rotation speed, and the third compensation torque is less than the fourth compensation torque.

In some embodiments, the vehicle control module is configured to: when it is determined that the driving speed of the vehicle is within a first speed range corresponding to a low-speed driving mode, and a decrease in a brake pedal opening degree of the vehicle is greater than a first opening degree value, further determine whether the rotation speed of the motor of the vehicle is increased; and the vehicle control module is configured to: when it is determined that a rotation speed of the motor of the vehicle is increased, determine, based on a gear of the vehicle and the rotation direction of the motor of the vehicle, whether the vehicle is in a sliding state during a brake idle stroke.

It should be understood that the third aspect and the embodiments in the third aspect of this application can achieve a same technical effect as the first aspect and the embodiments in the first aspect of this application.

The foregoing description is merely an overview of the technical solutions in the embodiments of this application. In order to better understand the technical means of this application to achieve implementation according to content of the specification, and to make the above and other objects, features and advantages of this application more obvious and easy to understand, the following describes specific embodiments of this application.

BRIEF DESCRIPTION OF DRAWINGS

Other advantages and benefits will become apparent to those of ordinary skill in the art by reading detailed description of the exemplary embodiments below. The accompanying drawings are merely intended to illustrate the purposes of the preferred implementations, and should not be construed as limitations on this application. In all the accompanying drawings, the same drawing numerals represent the same components. In the accompanying drawings.

DESCRIPTION OF EMBODIMENTS

Figure 1:
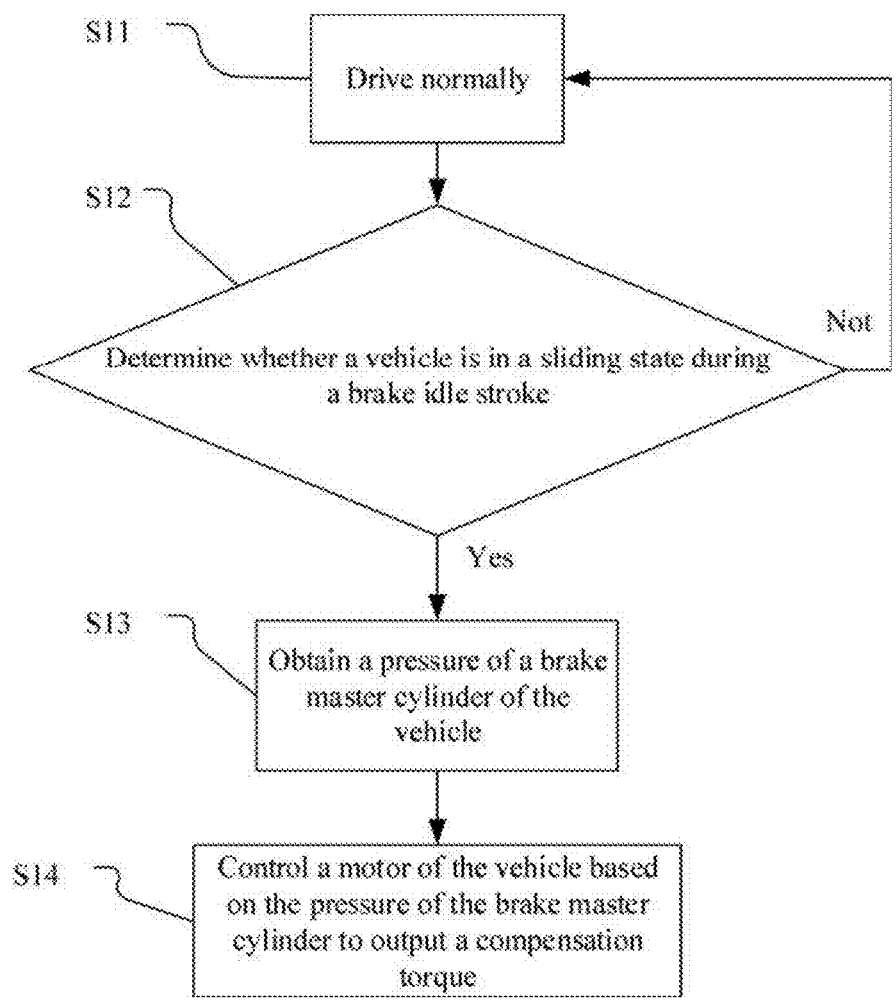
FIG. 1 is a flowchart of a torque compensation method for a vehicle according to some embodiments of this application.

The following describes in detail embodiments of technical solutions of this application with reference to accompanying drawings. The following embodiments are merely intended to describe more clearly the technical solutions of this application, and therefore can be used as only examples rather than limitations on the protection scope of this application.

Unless otherwise defined, all technical and scientific terms used in this specification shall have the same meanings as commonly understood by those skilled in the art to which this application belongs. The terms used in this specification are merely intended to describe the specific embodiments but not intended to constitute any limitations on this application. The terms "include", "comprise", and "having" and any other variations thereof in the specification, the claims and the foregoing brief description of drawings of this application are intended to cover a non-exclusive inclusion.

In the description of the embodiments of this application, the technical terms such as "first" and "second" are merely intended to distinguish between different objects, and shall not be understood as any indication or implication of relative importance or an implicit indication of the number, a particular order, or a subordinate relationship of the indicated technical features. In the description of the embodiments of this application, "plurality" means more than two, unless otherwise specifically defined.

The term "embodiment" described in this specification means that specific features, structures or characteristics described in combination with the embodiments may be incorporated in at least one embodiment of this application. The word "embodiment" in various positions in the specification does not necessarily refer to a same embodiment, or an independent or alternative embodiment that is exclusive of other embodiments. Persons skilled in the art explicitly and implicitly understand that the embodiments described in this specification may combine with another embodiment.

In the descriptions of the embodiments of this application, unless otherwise specified and defined explicitly, the technical terms "installment", "link", "connection", and "fix" should be understood in their general senses. For example, the terms may be a fixed connection, a detachable connection, or an integrated connection; or may be a mechanical connection or an electrical connection; or may be a direct connection, or an indirect connection through an intermediate medium; or may be an internal connection between two components or an interactive relationship between two components. Persons of ordinary skill in the art can understand specific meanings of these terms in this application based on specific situations.

The steps described in order in this specification do not necessarily mean that the embodiment or aspect is limited to the stated order. On the contrary, it can be conceivable that the steps may alternatively be performed in a different order or concurrently unless the next step is built based on the previous step, which necessarily requires that the previous step to be performed first and then the latter step (this case is clearer in the specific embodiments). The order described herein may be a preferred embodiment.

At present, according to the development of the market situation, requirements for energy conservation and emission reduction are ever-increasing. Due to advantages of energy conservation and environmental friendliness, the market demand for electric vehicles is constantly growing. For the electric vehicles, people also impose higher requirements on the control technology.

In the description of the embodiments of this application, an electric vehicle may be a battery electric vehicle (BEV), or may be a hybrid electric vehicle (HEV). The battery electric vehicle is a vehicle powered entirely by a rechargeable battery such as a lead-acid battery, a nickel-cadmium battery, a nickel-metal hydride battery, or a lithium-ion battery. The hybrid electric vehicle is a vehicle powered by a rechargeable battery and a conventional power source (for example, gasoline, diesel, compressed natural gas, propane, or ethanol fuel), where the two types of power sources work separately or work together in different driving states of the vehicle. The hybrid electric vehicle in the embodiments of this application can be powered by a rechargeable battery when the vehicle is driving at a low speed.

In the electric vehicle, a vehicle control unit is a core control component, and has main functions of analyzing needs of the driver, monitoring a driving status of the vehicle, and coordinating work of control units such as a battery management system BMS, a micro control unit MCU, an engine management system EMS, a transmission control unit TCU, and the like, so as to implement functions such as vehicle power-on and power-off, drive control, energy recovery, accessory control, and troubleshooting. A brake master cylinder is a power source of a vehicle braking system, and a main role of the brake master cylinder is to convert a pedal force applied by the driver on a braking pedal to a pressure on the brake master cylinder, and further to a braking force applied on wheels of the vehicle, thereby achieving a braking effect of the vehicle.

The inventors have noticed that for some vehicles in the prior art, a vehicle control module receives an analog signal from the braking pedal, and then controls, based on the analog signal of the braking pedal, the brake master cylinder to output a braking force applied on the wheels of the vehicle. In these vehicles, the pressure of the brake master cylinder can precisely reflect an opening degree of the braking pedal (that is, the pressure of the brake master cylinder matches the opening degree of the braking pedal).

However, in the prior art, for some other electric vehicles, the pressure of the brake master cylinder cannot precisely reflect the opening degree of the braking pedal (that is, the pressure of the brake master cylinder does not match the opening degree of the braking pedal). These electric vehicles may slide during a brake idle stroke during driving. For example, for an existing electric vehicle, when the driver steps on the braking pedal, an input rod connected to the braking pedal displaces, and a stroke sensor of the braking pedal detects the displacement of the input rod and sends a displacement signal to a controller. The controller calculates a torque that a braking motor needs to generate, and a transmission apparatus converts the torque into a servo braking force of the brake master cylinder. In this case, the vehicle control module receives no analog signal of the braking pedal, and the opening degree of the braking pedal is deduced from the displacement of the input rod. For example, the displacement of the input rod multiplied by a coefficient, for example, 4.76, equals the opening degree of the braking pedal. In this case, because the opening degree of the braking pedal is generated from the braking system of the vehicle and cannot directly reflect a range of the brake idle stroke, the vehicle may slide during the brake idle stroke, which may cause a traffic accident such as collision, and even endanger people's life, thereby posing significant safety hazards. In addition, for these vehicles, calibration engineers may conduct tests to calibrate the opening degree of the braking pedal corresponding to the range of the brake idle stroke, so as to control the motor of the vehicle to output an appropriate compensation torque. However, the opening degree of the braking pedal may vary between vehicles, and if the opening degree of the braking pedal corresponding to the range of the brake idle stroke does not match the compensation torque output by the motor of the vehicle, sliding during the brake idle stroke cannot be effectively suppressed or an abnormal sound may occur after the wheels are stuck.

In order to resolve the problems occurring when the pressure of the brake master cylinder does not match the opening degree of the braking pedal, and effectively suppress sliding during the brake idle stroke of the vehicle, the applicants have found through researches that, the motor of the vehicle could be controlled based on the pressure of the brake master cylinder of the vehicle to output the compensation torque during driving. Specifically, the applicants have found through researches that, when the vehicle slides during the brake idle stroke, a braking force applied on the wheels of the vehicle from the brake master cylinder is not large enough to brake the wheels of the vehicle. In this case, the pressure of the brake master cylinder can reflect a range of the brake idle stroke more precisely. Controlling the motor of the vehicle based on the pressure of the brake master cylinder to output the compensation torque in a timely manner can effectively suppress sliding during the brake idle stroke of the vehicle, and ensure safe driving.

Based on the foregoing considerations, the inventors have designed, through in-depth research, a torque compensation method for a vehicle, where the vehicle includes a vehicle control module, and the torque compensation method includes: when the vehicle control module determines that the vehicle is in a sliding state during a brake idle stroke, obtaining, by the vehicle control module, a pressure of a brake master cylinder of the vehicle, and controlling a motor of the vehicle based on the pressure of the brake master cylinder to output a compensation torque. In this torque compensation method, when the vehicle is about to slide or is sliding during the brake idle stroke, the motor of the vehicle is controlled based on the pressure of the brake master cylinder to output the compensation torque in a timely manner, thereby effectively suppressing sliding during the brake idle stroke of the vehicle.

The torque compensation method disclosed in the embodiments of this application can be applied to vehicles, including but not limited to a vehicle with the pressure of the brake master cylinder not matching the opening degree of the braking pedal, and may be further applied to a vehicle in which no analog signal of the braking pedal is transmitted to the vehicle control module. With the torque compensation method disclosed in this application being used in such vehicles, sliding during a brake idle stroke can be suppressed effectively in a timely manner, and safe driving can be effectively ensured.

FIG. 1 is a flowchart of a torque compensation method for a vehicle according to some embodiments of this application. The vehicle includes a vehicle control module, and the torque compensation method is implemented by using the vehicle control module.

The torque compensation method for a vehicle in FIG. 1 starts from step S11.

In step S11, the vehicle control module controls the vehicle to drive normally. A vehicle control unit is a core control component of an electric vehicle. Being connected to a vehicle speed sensor of the vehicle, an acceleration pedal sensor, a braking pedal sensor, a motor, a gear controller, and a brake master cylinder, the vehicle control unit is capable of coordinating the work of control units such as a battery management system BMS, a micro control unit MCU, an engine management system EMS, and a transmission control unit TCU, thereby controlling the vehicle to drive normally. A person skilled in the art should understand that the torque compensation method for a vehicle in the present invention may include step S11, or may be implemented independently of step S11.

In step S12, the vehicle control module determines whether the vehicle is in a sliding state during a brake idle stroke.

For example, the vehicle control module first determines whether the vehicle is in a low-speed driving mode (that is, a crawl control mode). In this application, the driving speed of the vehicle in the low-speed driving mode is 0-10 km/h. However, it should be understood that, based on different application scenarios, a range of the driving speed of the vehicle in the low-speed driving mode may vary.

If the vehicle control module determines that the vehicle is not in the low-speed driving mode, the vehicle is determined to be in a medium-high speed driving mode; in this case, sliding may not occur during braking. In this case, the vehicle control module determines that the vehicle may not be in a sliding state during the brake idle stroke, and returns to determine in real time whether the vehicle is in the low-speed driving mode. It should be understood that the torque compensation method for a vehicle of this application should not be used as far as possible when the vehicle is in the medium-high speed driving mode, so as to avoid a huge shock on the vehicle.

If the vehicle control module determines that the vehicle is in the low-speed driving mode, the vehicle control module further determines whether a decrease in an opening degree of a braking pedal of the vehicle is greater than a specific opening degree (for example, whether the decrease in the opening degree of the braking pedal is greater than 12%), that is, to determine whether a driver attempts to brake the vehicle. If the vehicle control module determines that the value of the opening degree of the braking pedal of the vehicle is not decreased or the decrease in the opening degree of the braking pedal is less than 12%, it is determined that the driver does not attempt to brake the vehicle. Then, the vehicle control module returns to determine in real time whether the decrease in the opening degree of the braking pedal of the vehicle is greater than a specific opening degree. If the vehicle control module determines that the decrease in the opening degree of the braking pedal of the vehicle is greater than a specific opening degree (for example, the decrease in the opening degree of the braking pedal is greater than 12%), it is determined whether a rotation speed of a motor of the vehicle is increased or not.

If the vehicle control module determines that the rotation speed of the motor of the vehicle is decreased normally, it is determined that the vehicle is normally braked for deceleration.

If the vehicle control module determines that the rotation speed of the motor of the vehicle is increased abnormally, it is determined that the vehicle is possibly in the sliding state during the brake idle stroke, and further determined, based on a gear of the vehicle and a rotation direction of the motor, whether the vehicle is in the sliding state during the brake idle stroke. For example, if the gear of the vehicle at that time is a drive gear D and the rotation direction of the motor is a reverse rotation direction, the vehicle is possibly in a sliding state on level ground or downhill during a brake idle stroke. For another example, if the gear of the vehicle at that time is a reverse gear R and the rotation direction of the motor is a forward rotation direction, the vehicle is possibly in a sliding state on uphill during a brake idle stroke.

In this application, in order to obtain speed information of the vehicle, the vehicle control module sends a vehicle speed request instruction to the vehicle speed sensor. After receiving the vehicle speed request instruction, the vehicle speed sensor returns information about current vehicle speed to the vehicle control module. Similarly, in order to obtain the opening degree of the braking pedal of the vehicle, the vehicle control module sends a braking pedal opening-degree request instruction to the braking pedal sensor. After receiving the braking pedal opening-degree request instruction, the braking pedal sensor returns information about current raking pedal opening-degree to the vehicle control module. Further similarly, in order to obtain information such as a motor rotation speed and a motor rotation direction of the vehicle, the vehicle control module sends a motor rotation speed and a motor rotation direction request instruction to the motor of the vehicle. After receiving the motor rotation speed and motor rotation direction request instruction, the motor of the vehicle returns information about current motor rotation speed and motor rotation direction to the vehicle control module. Further similarly, in order to obtain gear information of the vehicle, the vehicle control module sends a current-gear request instruction to the gear controller of the vehicle. After receiving the current-gear request instruction, the gear controller returns information about a current gear of the vehicle to the vehicle control module.

As a core control component of the electric vehicle, the vehicle control unit is connected to the foregoing components of the vehicle, and is able to send request information to these components to obtain information such as the vehicle speed, the opening degree of the braking pedal, the motor rotation speed, and the motor rotation direction, and further determines whether the vehicle is in the low-speed driving mode.

Referring to FIG. 1 again, if the vehicle control module determines that the vehicle is not in the sliding state during the brake idle stroke, step S11 is performed to continuously control the vehicle for normal driving. In this case, the torque compensation method for a vehicle of this application is not implemented. If the vehicle control module determines that the vehicle is in the sliding state during the brake idle stroke, step S13 is performed to obtain a pressure of the brake master cylinder of the vehicle. Because the vehicle control module is connected to the brake master cylinder of the vehicle, the vehicle control module may send a brake master cylinder pressure request instruction for the vehicle to the brake master cylinder of the vehicle. After receiving the request instruction, the brake master cylinder returns information about the pressure of the brake master cylinder to the vehicle control module.

Then, step S14 is performed, that is, the vehicle control module controls the motor of the vehicle based on the pressure of the brake master cylinder to output a compensation torque. Because the pressure of the brake master cylinder can precisely reflect a range of the brake idle stroke of the vehicle, the motor of the vehicle is controlled to output the compensation torque in a timely manner, thereby effectively suppressing sliding during the brake idle stroke of the vehicle, and ensuring safe driving.

In this application, the motor of the vehicle is an engine used to provide the power source for driving the vehicle. In addition, a direction of the compensation torque output by the motor of the vehicle is opposite to a current rotation direction of the wheels. For example, in step S12 of determining whether the vehicle is in a sliding state during a brake idle stroke, if the gear of the vehicle is a drive gear D and the rotation direction of the motor is a reverse rotation direction, a direction of the compensation torque that the motor of the vehicle is controlled based on the pressure of the brake master cylinder to output needs to be a forward rotation direction. For another example, in step S12 of determining whether the vehicle is in a sliding state during a brake idle stroke, if the gear of the vehicle is a reverse gear R, and the rotation direction of the motor is a forward rotation direction, a direction of the compensation torque that the motor of the vehicle is controlled based on the pressure of the brake master cylinder to output needs to be a reverse rotation direction.

In step S14, after obtaining the pressure of the brake master cylinder, the vehicle control module searches a stored table "Pressure of brake master cylinder and compensation torque", and obtains, from the table "Pressure of brake master cylinder and compensation torque", a compensation torque that needs to be output by the motor of the vehicle.

In this application, after obtaining the compensation torque that needs to be output by the motor of the vehicle, the vehicle control module sends command information of the compensation torque value to the motor of the vehicle. The motor of the vehicle outputs a corresponding compensation torque value according to the command information.

In this application, the vehicle control module stores the table "Pressure of brake master cylinder and compensation torque" in an associated storage medium. After obtaining the pressure of the brake master cylinder, the vehicle control module sends a search request to the associated storage medium to obtain a compensation torque corresponding to the pressure of the brake master cylinder.

The table "Pressure of brake master cylinder and compensation torque" is developed with many factors considered. These factors include, but are not limited to, a vehicle weight, a wheel drag coefficient, and so on. An initial version of the table "Pressure of brake master cylinder and compensation torque" is developed based on a maximum compensation torque that is required for a half-loaded vehicle to remain still on a slope with a specific gradient. That is, when the half-loaded vehicle is parked on a slope with a specific gradient and remains still, the vehicle control module obtains compensation torques that the motor of the vehicle needs to output under different pressures of the brake master cylinder. Preferably, the gradient is selected to be 7 degrees. In a normal case, when the gradient is greater than 7 degrees, the driver usually steps heavily on the braking pedal and may not let any sliding occur; and when the gradient is less than 7 degrees, sliding possibly occurs during the brake idle stroke. During actual driving, a calibration engineer may adjust the initial version of the table "Pressure of brake master cylinder and compensation torque" based on an actual situation.

An embodiment of the table "Pressure of brake master cylinder and compensation torque" is shown in Table 1.

TABLE 1

Pressure of brake master cylinder and compensation torque

| | Pressure of master cylinder (bar) | | | |
|---|---|---|---|---|
| | 0 | 1 | 1.5 | 2 |
| Compensation torque (Nm) | 45 | 40 | 20 | 10 |

In Table 1, when the pressure of the master cylinder is 0 bar, the motor of the vehicle needs to output a 45 Nm compensation torque; when the pressure of the master cylinder is 1 bar, the motor of the vehicle needs to output a 40 Nm compensation torque; when the pressure of the master cylinder is 1.5 bar, the motor of the vehicle needs to output a 20 Nm compensation torque; and when the pressure of the master cylinder is 2 bar, the motor of the vehicle needs to output a 10 Nm compensation torque.

It can be seen from Table 1 "Pressure of brake master cylinder and compensation torque" that a smaller pressure of the brake master cylinder indicates a larger compensation torque that the motor of the vehicle needs to output. As the driver continues to step heavily on the braking pedal, the pressure of the brake master cylinder increases, and the compensation torque that the motor of the vehicle needs to output gradually decreases. When the opening degree of the braking pedal is greater than the range of the brake idle stroke, the pressure of the brake master cylinder is large enough and the motor of the vehicle does not need to output the compensation torque.

Preferably, in step S12, the vehicle control module obtains the pressure of the brake master cylinder of the vehicle in real time. Because a real-time pressure of the brake master cylinder reflects a real-time braking force applied on the wheels, the range of the brake idle stroke can be reflected more precisely, and the motor of the vehicle is controlled to output the compensation torque. In this way, the torque compensation method for the vehicle is further detailed.

Figure 2:
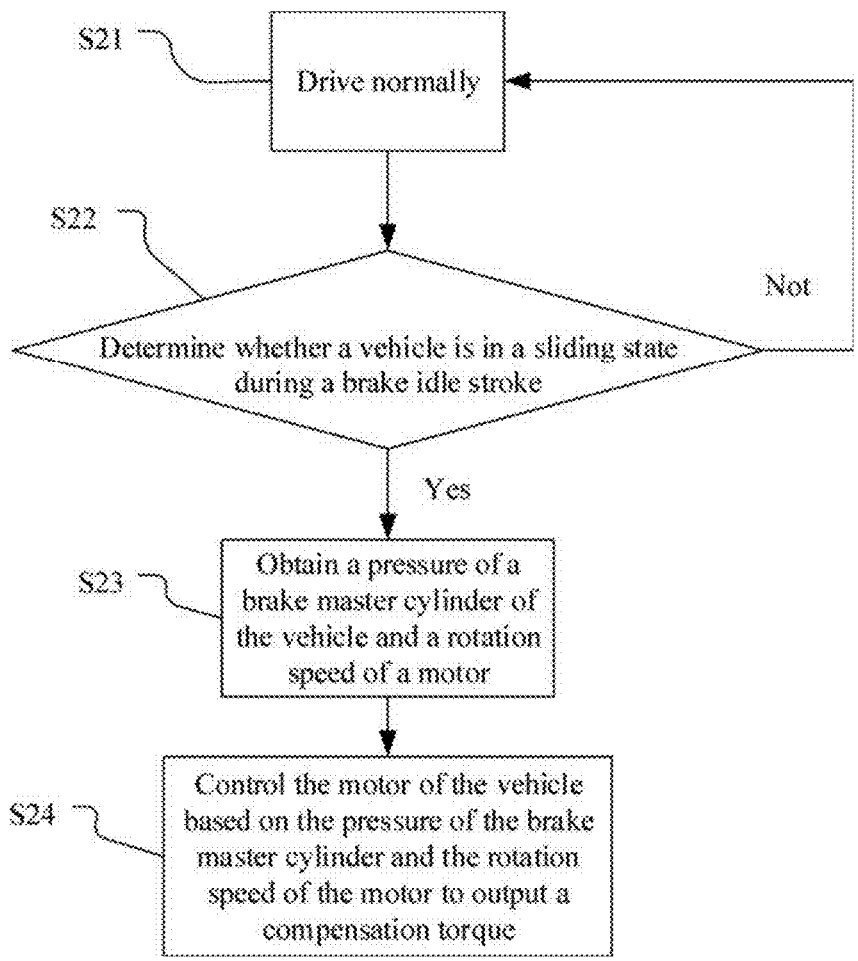
FIG. 2 is a flowchart of a torque compensation method for a vehicle according to some other embodiments of this application.

FIG. 2 is a flowchart of a torque compensation method for a vehicle according to some other embodiments of this application. Similar to that described with respect to FIG. 1, the vehicle includes a vehicle control module. The torque compensation method is implemented by using the vehicle control module.

The torque compensation method for a vehicle in FIG. 2 starts from step S21.

In step S21, the vehicle control module controls the vehicle to drive normally. A person skilled in the art should understand that the torque compensation method for a vehicle in the present invention may include step S21, or may be implemented independently of step S21.

In step S22, similar to the description of step S12 in FIG. 1, the vehicle control module determines whether the vehicle is in a sliding state during a brake idle stroke. An implementation process of step S22 is similar to that of step S12. Details are not described herein again.

If the vehicle control module determines that the vehicle is not in the sliding state during the brake idle stroke, step S21 is performed to continuously control the vehicle for normal driving. In this case, the torque compensation method for a vehicle of this application is not implemented. If the vehicle control module determines that the vehicle is in the sliding state during the brake idle stroke, step S23 is performed to obtain a pressure of the brake master cylinder of the vehicle and a rotation speed of a motor of the vehicle. Because the vehicle control module is connected to the brake master cylinder and the motor of the vehicle, send a brake master cylinder pressure and motor rotation speed request instruction for the vehicle to the brake master cylinder of the vehicle. After receiving the request instruction, the brake master cylinder and a host return information about the pressure of the brake master cylinder and the rotation speed of the motor to the vehicle control module.

Then, step S24 is performed, that is, the vehicle control module controls the motor of the vehicle to output a compensation torque based on the pressure of the brake master cylinder and the rotation speed of the motor.

The inventors of this application have found that the compensation torque that the motor of the vehicle needs to output is not only related to the pressure of the brake master cylinder of the vehicle, but also related to the rotation speed of the motor of the vehicle. When the rotation speed of the motor of the vehicle is different, the compensation torque that needs to be output by the motor of the vehicle is also different. In the torque compensation method for a vehicle in FIG. 2, the motor of the vehicle is controlled based on the pressure of the brake master cylinder of the vehicle and the rotation speed of the motor that are obtained to output the compensation torque in a timely manner. In this way, some factors such as inertia of the vehicle can be considered, thereby more effectively suppressing sliding during the brake idle stroke of the vehicle.

Similar to the description of step S14 in FIG. 1, the motor of the vehicle is an engine used to provide the power source for driving the vehicle. In addition, a direction of the compensation torque output by the motor of the vehicle is opposite to a current rotation direction of the wheels.

In step S24, after obtaining the pressure of the brake master cylinder and the rotation speed of the motor, the vehicle control module searches a stored table "Pressure of brake master cylinder, rotation speed, and compensation torque", and obtains, from the table "Pressure of brake master cylinder, rotation speed, and compensation torque", the compensation torque that needs to be output by the motor of the vehicle.

In this application, after obtaining the compensation torque that needs to be output by the motor of the vehicle, the vehicle control module sends command information of the compensation torque value to the motor of the vehicle. The motor of the vehicle outputs a corresponding compensation torque value according to the command information.

In this application, the vehicle control module stores the table "Pressure of brake master cylinder, rotation speed, and compensation torque" in an associated storage medium. After obtaining the pressure of the brake master cylinder and the rotation speed of the motor, the vehicle control module sends a search request to the associated storage medium to obtain a compensation torque corresponding to the pressure of the brake master cylinder and the rotation speed of the motor.

The table "Pressure of brake master cylinder, rotation speed, and compensation torque" is developed with many factors considered. These factors include, but are not limited to, a vehicle weight, a wheel drag coefficient, and so on. An initial version of the table "Pressure of brake master cylinder, rotation speed, and compensation torque" is developed based on a maximum compensation torque that is required for a half-loaded vehicle to remain still on a slope with a specific gradient. In other words, when the half-loaded vehicle is parked on a slope with a specific gradient and remains still, the vehicle control module obtains compensation torques that the motor of the vehicle needs to output under different pressures of the brake master cylinder. Preferably, the gradient is selected to be 7 degrees. In a normal case, when the gradient is greater than 7 degrees, the driver usually steps heavily on the braking pedal and may not let any sliding occur; and when the gradient is less than 7 degrees, sliding possibly occurs during the brake idle stroke. During actual driving, a calibration engineer may adjust the initial version of the table "Pressure of brake master cylinder, rotation speed, and compensation torque" based on an actual situation.

An embodiment of the table "Pressure of brake master cylinder, rotation speed, and compensation torque" is shown in Table 2.

TABLE 2

Pressure of brake master cylinder, rotation speed, and compensation torque

| Rotation speed of motor (rps) | Pressure of master cylinder (bar) | | | |
| --- | --- | --- | --- | --- |
| | 0 | 1 | 1.5 | 2 |
| 50 | 25 | 20 | 10 | 0 |
| 100 | 45 | 40 | 20 | 10 |
| 200 | 65 | 60 | 40 | 20 |

In Table 2, in a case that the pressure of the brake master cylinder is 0 bar, when the rotation speed of the motor of the vehicle is 50 rps, the motor of the vehicle needs to output a compensation torque of 25 Nm; when the rotation speed of the motor of the vehicle is 100 rps, the motor of the vehicle needs to output a compensation torque of 45 Nm; or when the rotation speed of the motor of the vehicle is 200 rps, the motor of the vehicle needs to output a compensation torque of 65 Nm. That is, when the pressure of the brake master cylinder is 0 bar, a larger rotation speed of the motor of the vehicle indicates a larger compensation torque that the motor of the vehicle needs to output. This is also true in a case that the pressure of the brake master cylinder is 1 bar, 1.5 bar, or 2 bar.

It can be seen from Table 2 "Pressure of brake master cylinder, rotation speed, and compensation torque" that, when the pressure of the brake master cylinder is the same, a larger rotation speed of the motor of the vehicle indicates a larger compensation torque that the motor of the vehicle needs to output. With a larger rotation speed of the motor of the vehicle, a series of factors such as the inertia of the vehicle need to be considered, and the compensation torque that the motor of the vehicle needs to output is larger.

Preferably, in step S22, the vehicle control module obtains the pressure of the brake master cylinder of the vehicle and the rotation speed of motor of the vehicle in real time. Because a real-time pressure of the brake master cylinder and the rotation speed of motor of the vehicle reflect a real-time braking force applied on the wheels, the range of the brake idle stroke can be reflected more precisely, and the motor of the vehicle is controlled to output the compensation torque. In this way, the torque compensation method for the vehicle is further detailed.

According to some embodiments of this application, the torque compensation method is implemented based on that the range of the brake idle stroke is more precisely determined based on the pressure of the brake master cylinder, thereby effectively suppressing sliding during the brake idle stroke of the vehicle, and ensuring safe driving.

It should be finally noted that the foregoing embodiments are merely intended for describing the technical solutions of this application but not for limiting this application. Although this application is described in detail with reference to such embodiments, persons of ordinary skill in the art should understand that they may still make modifications to the technical solutions described in the embodiments or make equivalent replacements to some or all technical features thereof, without departing from the scope of the technical solutions of the embodiments of this application and shall all be covered by the scope of the claims and specification of this application. In particular, as long as there is no structural conflict, the technical features mentioned in the embodiments can be combined in any manner. This application is not limited to the specific embodiments disclosed in this specification, but includes all technical solutions falling within the scope of the claims.

What is claimed is:

1. A torque compensation method for a vehicle, wherein the vehicle comprises a vehicle controller, and the torque compensation method comprises:
when the vehicle controller determines that the vehicle is in a sliding state during a brake idle stroke, obtaining, by the vehicle controller, a pressure of a brake master cylinder of the vehicle, and controlling a motor of the vehicle based on the pressure of the brake master cylinder to output a compensation torque,
wherein the obtaining, by the vehicle controller, a pressure of a brake master cylinder of the vehicle, and controlling a motor of the vehicle based on the pressure of the brake master cylinder to output a compensation torque further comprises:
obtaining, by the vehicle controller, the pressure of the brake master cylinder of the vehicle and a rotation speed of the motor of the vehicle in real time, and controlling, based on the pressure of the brake master cylinder and the rotation speed of the motor of the vehicle, the motor of the vehicle to output the compensation torque.

2. The torque compensation method according to claim 1, wherein the obtaining, by the vehicle controller, a pressure of a brake master cylinder of the vehicle, and controlling a motor of the vehicle based on the pressure of the brake master cylinder to output a compensation torque comprises:
in a case that the pressure of the brake master cylinder obtained by the vehicle controller comprises a first pressure, controlling, by the vehicle controller, the motor of the vehicle to output a compensation torque comprising a first compensation torque; and
in a case that the pressure of the brake master cylinder obtained by the vehicle controller comprises a second pressure, controlling, by the vehicle controller, the motor of the vehicle to output a compensation torque comprising a second compensation torque;
wherein the first pressure is less than the second pressure, and the first compensation torque is greater than the second compensation torque.

3. The torque compensation method according to claim 1, wherein the obtaining, by the vehicle controller, a pressure of a brake master cylinder of the vehicle comprises:
obtaining, by the vehicle controller, the pressure of the brake master cylinder of the vehicle in real time.

4. The torque compensation method according to claim 1, wherein the obtaining, by the vehicle controller, the pressure of the brake master cylinder of the vehicle and a rotation speed of the motor of the vehicle in real time, and controlling, based on the pressure of the brake master cylinder and the rotation speed of the motor of the vehicle, the motor of the vehicle to output the compensation torque further comprises:
in a case that the pressure of the brake master cylinder obtained by the vehicle controller comprises a third pressure, and the rotation speed of the motor of the vehicle comprises a first rotation speed, controlling, by the vehicle controller, the motor of the vehicle to output a compensation torque comprising a third compensation torque; and
in a case that the pressure of the brake master cylinder obtained by the vehicle controller comprises the third pressure, and the rotation speed of the motor of the vehicle comprises a second rotation speed, controlling, by the vehicle controller, the motor of the vehicle to output a compensation torque comprising a fourth compensation torque;
wherein the first rotation speed is less than the second rotation speed, and the third compensation torque is less than the fourth compensation torque.

5. The torque compensation method according to claim 1, wherein that the vehicle controller determines that the vehicle is in the sliding state during the brake idle stroke comprises:
when the vehicle controller determines that a driving speed of the vehicle is within a first speed range corresponding to a low-speed driving mode, and a decrease in a brake pedal opening degree of the vehicle is greater than a first opening degree value, further determining, by the vehicle controller, whether a rotation speed of the motor of the vehicle is increased; and when the vehicle controller determines that the rotation speed of the motor of the vehicle is increased, determining, by the vehicle controller based on a gear of the vehicle and the rotation speed and the direction of the motor of the vehicle, whether the vehicle is in the sliding state during the brake idle stroke.

6. A non-transitory computer-readable storage medium, wherein the computer-readable storage medium stores a computer instruction, and when the computer instruction is executed by a computing device, the computing device is enabled to implement the torque compensation method according to claim 1.

7. A torque compensation apparatus of a vehicle, comprising a vehicle controller and at least one memory including computer instruction, wherein when the computer instruction is executed, the vehicle controller is configured to: when it is determined that the vehicle is in a sliding state during a brake idle stroke, obtain a pressure of a brake master cylinder of the vehicle and a rotation speed of the motor of the vehicle in real time, and control, based on the pressure of the brake master cylinder and the rotation speed of the motor of the vehicle, a motor of the vehicle to output a compensation torque of the vehicle.

8. The torque compensation apparatus according to claim 7, wherein the vehicle controller is configured to: in a case that the pressure of the brake master cylinder obtained by the vehicle controller comprises a first pressure, control the motor of the vehicle to output a compensation torque comprising a first compensation torque; and the vehicle controller is configured to: in a case that the pressure of the brake master cylinder obtained by the vehicle controller comprises a second pressure, control the motor of the vehicle to output a compensation torque comprising a second compensation torque;

wherein the first pressure is less than the second pressure, and the first compensation torque is greater than the second compensation torque.

9. The torque compensation apparatus according to claim 7, wherein the vehicle controller is configured to obtain the pressure of the brake master cylinder of the vehicle in real time.

10. The torque compensation apparatus according to claim 7, wherein the vehicle controller is configured to: in a case that the pressure of the brake master cylinder obtained by the vehicle controller comprises a third pressure, and the rotation speed of the motor of the vehicle comprises a first rotation speed, control the motor of the vehicle to output a compensation torque comprising a third compensation torque; and the vehicle controller is configured to: in a case that the pressure of the brake master cylinder obtained by the vehicle controller comprises the third pressure, and the rotation speed of the motor of the vehicle comprises a second rotation speed, control the motor of the vehicle to output a compensation torque comprising a fourth compensation torque;

wherein the first rotation speed is less than the second rotation speed, and the third compensation torque is less than the fourth compensation torque.

11. The torque compensation apparatus according to claim 7, wherein the vehicle controller is configured to: when it is determined that the driving speed of the vehicle is within a first speed range corresponding to a low-speed driving mode, and a decrease in a brake pedal opening degree of the vehicle is greater than a first opening degree value, further determine whether the rotation speed of the motor of the vehicle is increased; and the vehicle controller is configured to: when it is determined that a rotation speed of the motor of the vehicle is increased, determine, based on a gear of the vehicle and the rotation speed and direction of the motor of the vehicle, whether the vehicle is in a sliding state during a brake idle stroke.

12. A torque compensation method for a vehicle, wherein the vehicle comprises a vehicle controller, and the torque compensation method comprises:

when the vehicle controller determines that the vehicle is in a sliding state during a brake idle stroke, obtaining, by the vehicle controller, a pressure of a brake master cylinder of the vehicle, and controlling a motor of the vehicle based on the pressure of the brake master cylinder to output a compensation torque, wherein that the vehicle controller determines that the vehicle is in the sliding state during the brake idle stroke comprises:

when the vehicle controller determines that a driving speed of the vehicle is within a first speed range corresponding to a low-speed driving mode, and a decrease in a brake pedal opening degree of the vehicle is greater than a first opening degree value, further determining, by the vehicle controller, whether a rotation speed of the motor of the vehicle is increased; and when the vehicle controller determines that the rotation speed of the motor of the vehicle is increased, determining, by the vehicle controller based on a gear of the vehicle and the rotation speed and the direction of the motor of the vehicle, whether the vehicle is in the sliding state during the brake idle stroke.

13. The torque compensation method according to claim 12, wherein the obtaining, by the vehicle controller, a pressure of a brake master cylinder of the vehicle, and controlling a motor of the vehicle based on the pressure of the brake master cylinder to output a compensation torque comprises:

in a case that the pressure of the brake master cylinder obtained by the vehicle controller comprises a first pressure, controlling, by the vehicle controller, the motor of the vehicle to output a compensation torque comprising a first compensation torque; and in a case that the pressure of the brake master cylinder obtained by the vehicle controller comprises a second pressure, controlling, by the vehicle controller, the motor of the vehicle to output a compensation torque comprising a second compensation torque;

wherein the first pressure is less than the second pressure, and the first compensation torque is greater than the second compensation torque.

14. The torque compensation method according to claim 12, wherein the obtaining, by the vehicle controller, a pressure of a brake master cylinder of the vehicle comprises:

obtaining, by the vehicle controller, the pressure of the brake master cylinder of the vehicle in real time.

15. The torque compensation method according to claim 12, wherein the obtaining, by the vehicle controller, a pressure of a brake master cylinder of the vehicle, and controlling a motor of the vehicle based on the pressure of the brake master cylinder to output a compensation torque further comprises:

obtaining, by the vehicle controller, the pressure of the brake master cylinder of the vehicle and a rotation speed of the motor of the vehicle in real time, and controlling, based on the pressure of the brake master cylinder and the rotation speed of the motor of the vehicle, the motor of the vehicle to output the compensation torque.

16. The torque compensation method according to claim 12, wherein the obtaining, by the vehicle controller, the pressure of the brake master cylinder of the vehicle and a rotation speed of the motor of the vehicle in real time, and controlling, based on the pressure of the brake master cylinder and the rotation speed of the motor of the vehicle, the motor of the vehicle to output the compensation torque further comprises:

in a case that the pressure of the brake master cylinder obtained by the vehicle controller comprises a third pressure, and the rotation speed of the motor of the vehicle comprises a first rotation speed, controlling, by the vehicle controller, the motor of the vehicle to output a compensation torque comprising a third compensation torque; and in a case that the pressure of the brake master cylinder obtained by the vehicle controller comprises the third pressure, and the rotation speed of the motor of the vehicle comprises a second rotation speed, controlling, by the vehicle controller, the motor of the vehicle to output a compensation torque comprising a fourth compensation torque;

wherein the first rotation speed is less than the second rotation speed, and the third compensation torque is less than the fourth compensation torque.

17. The torque compensation method according to claim 12, wherein that the vehicle controller determines that the vehicle is in the sliding state during the brake idle stroke comprises:

when the vehicle controller determines that a driving speed of the vehicle is within a first speed range corresponding to a low-speed driving mode, and a decrease in a brake pedal opening degree of the vehicle is greater than a first opening degree value, further determining, by the vehicle controller, whether a rotation speed of the motor of the vehicle is increased; and when the vehicle controller determines that the rotation speed of the motor of the vehicle is increased, determining, by the vehicle controller based on a gear of the vehicle and the rotation speed and the direction of the motor of the vehicle, whether the vehicle is in the sliding state during the brake idle stroke.

18. A non-transitory computer-readable storage medium, wherein the computer-readable storage medium stores a computer instruction, and when the computer instruction is executed by a computing device, the computing device is enabled to implement the torque compensation method according to claim 12.

* * * * *